United States Patent
Kafka

(12) 
(10) Patent No.: US 11,420,104 B2
(45) Date of Patent: *Aug. 23, 2022

(54) EROSION RESISTANT COMPOSITION AND METHOD OF MAKING SAME

(71) Applicant: Kafka Granite, LLC, Mosinee, WI (US)

(72) Inventor: Glenn Kafka, Mosinee, WI (US)

(73) Assignee: Kafka Granite, LLC, Mosinee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/859,720

(22) Filed: Apr. 27, 2020

(65) Prior Publication Data

US 2020/0254323 A1 Aug. 13, 2020

Related U.S. Application Data

(63) Continuation of application No. 15/620,974, filed on Jun. 13, 2017, now Pat. No. 10,675,525.

(51) Int. Cl.

| | |
|---|---|
| *A63B 69/36* | (2006.01) |
| *E02D 17/20* | (2006.01) |
| *C04B 20/10* | (2006.01) |
| *C04B 30/00* | (2006.01) |
| *C09K 17/40* | (2006.01) |
| *E01C 13/06* | (2006.01) |
| *A63B 102/32* | (2015.01) |
| *C04B 111/00* | (2006.01) |

(52) U.S. Cl.
CPC ...... *A63B 69/3691* (2013.01); *C04B 20/1022* (2013.01); *C04B 20/1025* (2013.01); *C04B 20/1044* (2013.01); *C04B 30/00* (2013.01); *C09K 17/40* (2013.01); *E02D 17/20* (2013.01); *A63B 2102/32* (2015.10); *C04B 2111/00741* (2013.01); *E01C 13/06* (2013.01)

(58) Field of Classification Search
CPC ............................ E02D 17/20; A63B 69/3691
See application file for complete search history.

(56) References Cited

U.S. PATENT DOCUMENTS

| | | | |
|---|---|---|---|
| 4,482,271 | A | 11/1984 | Mitchell et al. |
| 4,925,493 | A | 5/1990 | Lamoreaux |
| 5,746,546 | A | 5/1998 | Hubbs et al. |
| 6,652,643 | B1 | 11/2003 | Black |
| 6,821,332 | B2 | 11/2004 | Hubbs |
| 7,125,449 | B2 | 10/2006 | Hubbs |

(Continued)

*Primary Examiner* — Peter F Godenschwager
(74) *Attorney, Agent, or Firm* — Quarles & Brady LLP

(57) ABSTRACT

An erosion resistant composition includes a granular material and a wax including oil in which a weight percent of the oil in the wax is between 0.01-15%. The granular material includes a sand and has a first resistance to flow prior to being coated with the wax. The wax at least partially coats a portion of the granular material to form the erosion resistant composition which has a second resistance to flow after coating that is greater than the first resistance to flow prior to coating. The erosion resistant composition may be used, for example, in golf course bunkers or other landscaping applications. Related methods of making the erosion resistant composition are also described in which the granular material is dried, the wax is heated, and the granular material is blended with the melted wax.

7 Claims, 4 Drawing Sheets

(56) References Cited

U.S. PATENT DOCUMENTS

| | | |
|---|---|---|
| 8,062,143 B1 | 11/2011 | Meersman |
| 8,529,159 B2 | 9/2013 | Lemons |
| 8,845,443 B1 | 9/2014 | Weaver |
| 10,675,525 B2 * | 6/2020 | Kafka .................... E02D 17/20 |
| 2009/0317195 A1 | 12/2009 | Hubbs |
| 2010/0216639 A1 | 8/2010 | Hubbs |

* cited by examiner

EROSION RESISTANT COMPOSITION AND METHOD OF MAKING SAME

CROSS-REFERENCE TO RELATED APPLICATIONS

This application is a continuation application of U.S. non-provisional patent application Ser. No. 15/620,974 entitled "Erosion Resistant Composition and Method of Making Same" filed Jun. 13, 2017, the contents of which are incorporated herein by reference in its entirety for all purposes.

FIELD OF THE INVENTION

The present disclosure generally relates to erosion resistant compositions and methods of manufacturing such erosion resistant compositions. Such compositions may be used in various landscaping applications or athletic applications including, but not limited to, the construction of golf course bunkers, ballfield playing surfaces, trails and pathways, and so forth.

BACKGROUND

Golf course bunkers (also known as "sand traps") and their placement on the course are an important strategic component to the game of golf and, in many cases, help establish the aesthetic of the landscape of the course. Accordingly, golf courses seek to maintain the appearance, consistency, and playability of the bunkers.

Golf course bunkers come in a variety of architectures that can range from flat bunkers to flash-faced bunkers. Typically, flat bunkers do not contain exposed sand that lines the side faces of the bunker and are therefore less subject to erosion from wind and rain. In contrast, flash-faced bunkers include steep side walls that are lined with sand. While flash-faced bunkers can be attractive and can offer more rigorous playing conditions for the players, flash-faced bunkers are more difficult to maintain. Among other things, there may be costs associated with preventing or fixing the erosion that is prone to occur at the side faces of the bunker. Additionally, because the graded sand is prone to shift, the sand often needs to be replaced or filtered if the sand becomes blended with dirt or soil from exposed side faces.

The rate of erosion within a bunker having an inclined side can depend on a variety of factors such as, for example, exposure to wind, rain, and irrigation systems, but also depends on the height and slope of the side walls. As the height and slope of the side walls increases, so does the potential for the displacement of the sand. Over time, continuous erosion results in the exposure of the underlying soil layer. Prolonged exposure of the soil layer leads to the contamination of the sand with silt and clay, and eventually leads to discoloration, poor drainage, and firmer playing conditions. All of these factors contribute to a high maintenance cost associated with raking, filtering, or replacing the sand within the flash-faced bunkers.

Some erosion resistant systems have been developed that focus on stabilizing the interface between the sand and underlying soil. This has been attempted, for example, by installing a liner at the interface therebetween. However, one of the problems associated with applying a liner at the interface between the sand and the underlying soil layer is that the liner becomes exposed as the sand thins due to erosion. During routine maintenance, rakes often catch the material of the liner causing them to tear and form holes in the linear or the liner, when exposed, may curl up. Soil is then allowed to pass through the holes in the liner or pass around the liner and can contaminate the sand. Consequently, the lifetime of the liners is limited, and replacement of the liners is often an expensive process requiring that the sand trap effectively be emptied for replacement.

SUMMARY OF THE INVENTION

Disclosed herein is an erosion resistant composition of sand for golf course bunkers and other landscaping applications. Unlike the current state-of-the-art solutions that focus on stabilizing the interface between the sand and the underlying soil layer, the newly-disclosed erosion resistant sand composition inhibits erosion along the side walls of the bunker or along another inclined surface. Accordingly, the erosion resistant composition reduces maintenance and results in bunkers that are less susceptible to soil contamination. This erosion resistant composition can also be used in conjunction with existing techniques that prevent erosion, thus further prolonging the time between maintenance.

According to one aspect, an erosion resistant composition comprises a granular material and a wax containing oil in a weight percent between 0.01 and 15%. The granular material includes a sand and has a first resistance to flow in a "raw" or untreated state before being coated by the wax. The wax at least partially coats a portion of the granular material to form the erosion resistant composition. The erosion resistant composition has a second resistance to flow after coating that is greater than the first resistance to flow prior to coating.

According to another aspect, a method is provided for forming an erosion resistant composition. A granular material is dried until the granular material is free from liquid or moisture in which the granular material includes sand and has a first resistance to flow. A wax (including an oil content between 0.01 and 15% by weight of the wax) is heated above a melting point of the wax to form a melted wax. The melted wax is blended with the granular material to at least partially coat a portion of the granular material to form the erosion resistant composition. The erosion resistant composition has a second resistance to flow after coating that is greater than the first resistance to flow prior to coating.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

The invention will be better understood and features, aspects, and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The term "sand" as used herein refers to a loose granular material which may be formed by the disintegration of rocks to form particles smaller than gravel but coarser than silt. Sand can include ceramic materials or various combinations of ceramic materials potentially including recycled, crushed ceramic objects. In one form of the disclosed composition, the "sand" component includes pulverized and crushed porcelain from plumbing fixtures such as toilets and sinks. Accordingly, sand includes both naturally occurring sands and manmade manufactured sands.

The term "silt" as used herein refers to unconsolidated sedimentary material that is smaller than sand and has a particle size that can pass through a stack of 100 mesh.

Figure 1:
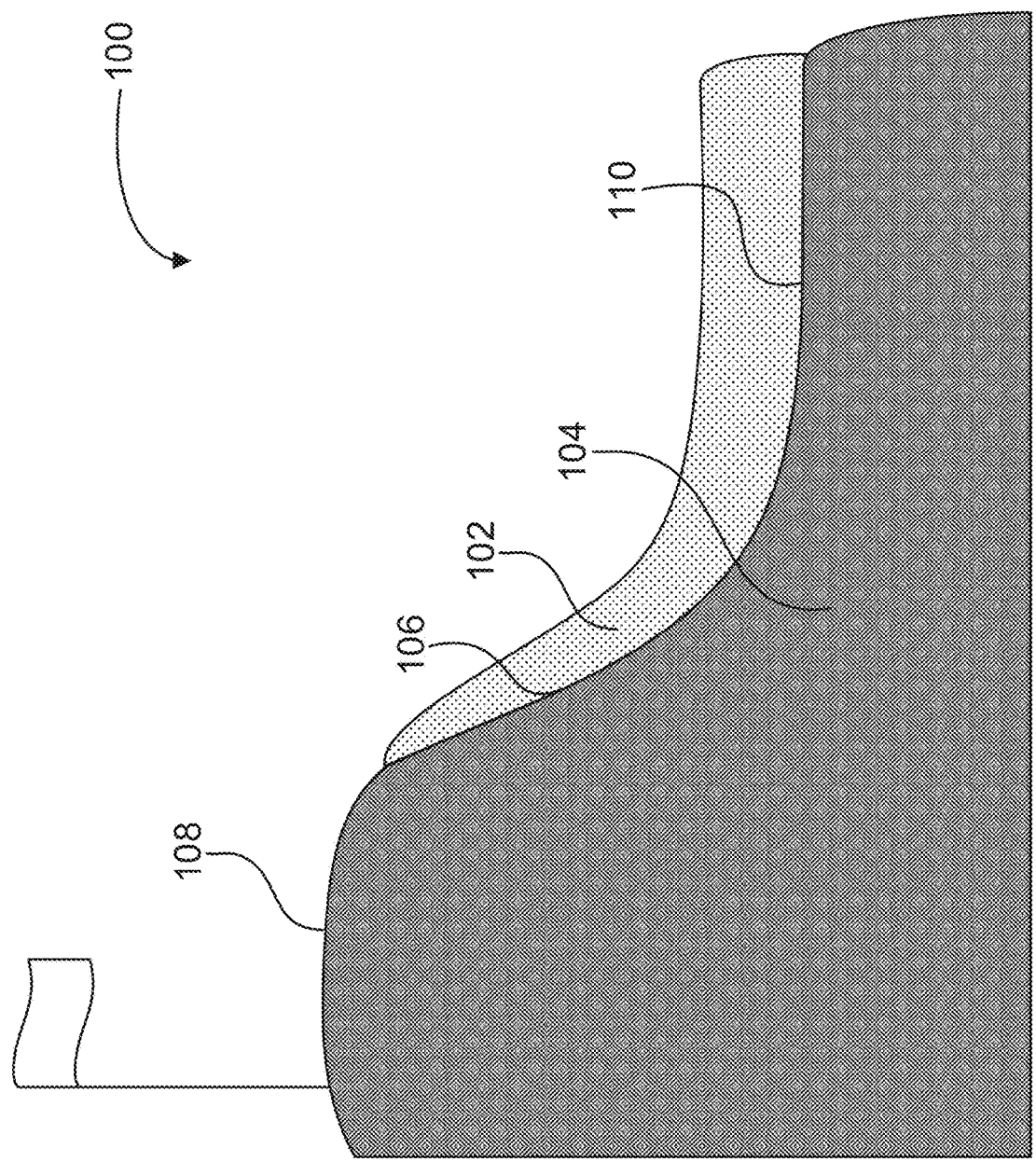
FIG. 1 illustrates a cross-sectional side view of an exemplary golf course bunker.

In one non-limiting example application, an erosion resistant composition 102 can be used in a golf course bunker 100 as depicted in FIG. 1. The golf course bunker 100 includes an under layer 104 that is positioned below the erosion resistant composition 102. In some embodiments, the under layer 104 includes an angularly-inclined wall 106 that slopes vertically downwards to connect an upper surface 108 to a lower surface 110, which are both generally horizontal, at least relative to the angularly-inclined wall 106. In some embodiments, the golf course bunker 100 includes approximately 2 to 12 inches of the erosion resistant composition 102 positioned above the lower surface 110, and approximately 1 to 5 inches of the erosion resistant composition 102 positioned above the inclined wall 106. These depths assist in reducing the amount of plugged lies along the inclined wall 106 and allows for a full swing of a golf club through the erosion resistant material 102 without allowing contact with the under layer 104. In some embodiments, the erosion resistant composition 102 covers between 60% and 100% of the inclined wall 106. In some embodiments, the erosion resistant composition covers at least 85% of the inclined wall 106.

A suitable under layer 104 may be comprised of a soil that naturally occurs at that geological location. Alternatively, a suitable under layer 104 can comprise soil and any additional filler materials (e.g., stones) that are commonly used in golf course construction.

Figure 2:
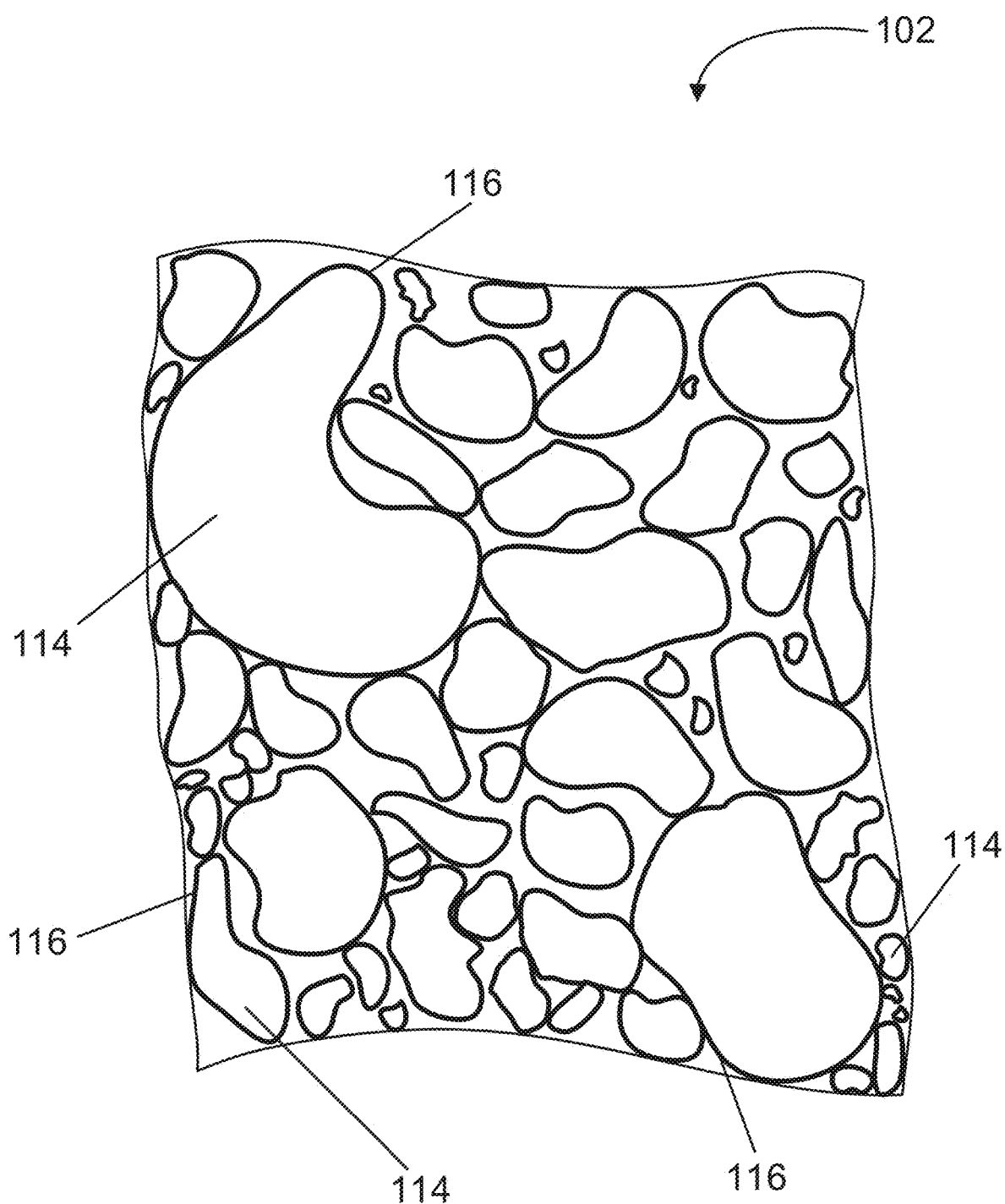
FIG. 2 illustrates a partial cross-sectional view of an erosion resistant sand composition according to one embodiment of the present disclosure.

Turning now to FIG. 2, FIG. 2 shows a non-limiting example of the morphology of the erosion resistant composition 102 according to one aspect of the present disclosure. The erosion resistant composition 102 includes a wax 116 that at least partially coats the surface of a plurality of granular materials 114 including sand. In the illustrated embodiment, the wax 116 is relatively homogenously dispersed as a uniform layer over the individual grains of the plurality of granular materials 114. While, in the illustrated form, the wax 116 is dispersed over the granular material 114 to form a homogenous coating, it is contemplated that the wax coating may be a relatively non-homogenous coating of varying thicknesses or only covering some fraction of the surface area of the individual grains, or only cover some of the grains. In varying embodiments, it is contemplated that the wax 116 may coat at least 25%, or at least 50%, or at least 75% of the individual grains of the plurality of granular materials 114. It will be appreciated that differing amounts of erosion resistance may result from different amounts and morphologies of the wax coating.

In some aspects, the consistency of the wax 116 acts to increase the cohesion between local granular particles to increase the interstitial viscosity and the overall resistance to flow. Increasing the interstitial viscosity by at least partially coating the plurality of granular materials 114 with the wax 116 assists in hindering erosion of the erosion resistant material 102 along the angularly-inclined walls 106. Reducing the rate of erosion along the angularly-inclined walls 106 assists in reducing maintenance costs of golf course bunkers 100, and results in bunkers that are less susceptible to soil contamination. Reducing soil contamination also allows the golf course bunker 100 to maintain the proper consistency and playability.

In one form, the wax may be a slack wax such as a wax having a composition including straight chain paraffinic hydrocarbons and branched, iso-paraffin hydrocarbons with excess residual oil from partial refining. In some forms of the wax, the average carbon number may be between 50 and 53, have a 95% carbon number spread around 52, and have an n-paraffin content (i.e., normal paraffin or single, unbranched, straight chain structure) from about 10 to 15 weight percent. It is noted that the wax can have a relatively low amount of oil in it. In some forms, the oil content is between 0.01 and 15 weight percent of the wax. In one particular form, the wax has less than 5 weight percent oil, and more preferably, around 2.1 weight percent oil, with the low oil content helping to impair the flowability of the composition. It will be appreciated that if the oil percentage of the wax is not limited to some degree, then flowability may increase in the coated composition, thereby reducing the resistance of the composition to erosion.

Another potential benefit of the wax 116 is that it increases the hydrophobicity of the erosion resistant composition 102 and can be useful in reducing the moisture content in the golf course bunker 100. High moisture contents tend to increase the firmness of the sand in golf course bunkers 100, thus increasing the hydrophobicity can assist in drying out the plurality of granular materials 114 to improve consistency and playability.

A suitable amount of wax 116 within the erosion resistant composition 102 can be between 2 to 8% by weight of the total composition. In some aspects, the amount of wax 116 within the erosion resistant composition 102 is between 7 to 23 gallons of wax per ton of granular material (based on some test blends which have been made from a wax having a density of approximately 6.8 lb/gal). In some embodiments, the amount of wax 116 within the erosion resistant composition 102 may be more narrowly between 4 to 6% by weight.

The plurality of grains of the granular material 114 for the golf course bunker 100 can primarily include sand. In some aspects, the sand comprises silica sand, continental sand, biogenic sand, limestone sand, gypsum sand, calcareous sand, dolomite sand, porcelain sand, granite sand, decomposed granite sand, and mixtures thereof. The "sand" may also be pulverized or crushed ceramic components, recycled for this specific purpose. In some aspects, the plurality of granular materials 114 can comprise crushed porcelain. For example, the crushed porcelain can be derived from plumbing fixtures such as porcelain toilets, sinks, bathtubs, bathroom tiles, and the like. It should be appreciated that various types of sand may be combined to form the composition.

It is contemplated that a wide range of potential mesh size distributions for the granular material may be blended with the wax. While some exemplary distributions are described in this paragraph, they are only exemplary in nature, and it is contemplated that by adjusting wax amounts, oil percentages, or blend times, erosion resistant compositions may be generated from a wide range of distributions. In some embodiments, the plurality of granular materials 114 comprises a sand with a particle size distribution that ranges between 0.002 to 8 mm. In some aspects, the granular material 114 includes between 5 to 15% of the sand that comprises coarse sand or fine gravel with a particle size between 1 to 8 mm. In some aspects, the granular material 114 includes between 60 to 80% of the sand that comprises medium to coarse sand with the particle size between 0.25 to 1 mm. In some aspects, the granular material 114 includes between 15 to 25% of the sand that comprises fine sand with the particle size between 0.15 to 0.25 mm. In some aspects, the granular material 114 includes between 5 to 15% of the sand that comprises silt with a particle size between 0.002 to 0.15 mm. In other aspects, the granular material 114 includes between 25 to 40% of the sand with a particle size of 0.15 mm or less.

An example wax 116 for the golf course bunker 100 can include a slack wax with an oil content potentially between 0.01 to 15% by weight. The oil content in the wax 116 is an important parameter that assists in controlling the dispersion and colligative properties of the wax 116 in the plurality of granular materials 114. In the instance where the oil content in the wax is too low, the dispersion of the wax 116 within the plurality of granular materials 114 may result in poorly dispersed clumps of wax 116 throughout the plurality of granular materials 114. In the instance where the oil content in the wax 116 is too high, the colligative properties and cohesive forces that assist in increasing the interstitial viscosity between the plurality of granular materials 114 may become too low.

A suitable oil content in the wax 116 is between 0.01 to 15% by weight. In some embodiments, the amount of oil in the wax is between 0.01 to 5% by weight. In one preferred embodiment, the amount of oil in the wax 116 may be 2.1% by weight.

In some forms, a suitable wax 116 for the golf course bunker 100 can include any wax 116 with a kinematic viscosity between 16 and 20 cSt when measured at 212° F. (100° C.). In other embodiments, a suitable wax 116 can include any wax with a flash point between 350 to 800° F. In some embodiments, the wax 116 may have a congealing point between 130 to 190° F. In other embodiments, the wax 116 may have a density between 5 and 10 lb/gal. In one particular form, the wax can have a density of 6.8 lb/gal.

In some embodiments, the erosion resistant composition 102 consists essentially of the wax 116 and the plurality of granular materials 114 including sand alone. In one non-limiting example, the plurality of granular materials 114 consists essentially of porcelain sand meaning that the erosion resistant composition is almost entirely (i.e., in excess of 98% by weight) manufactured sand and wax. Thus, the erosion resistant composition as produced is substantially free of clays and soils.

Figure 3:
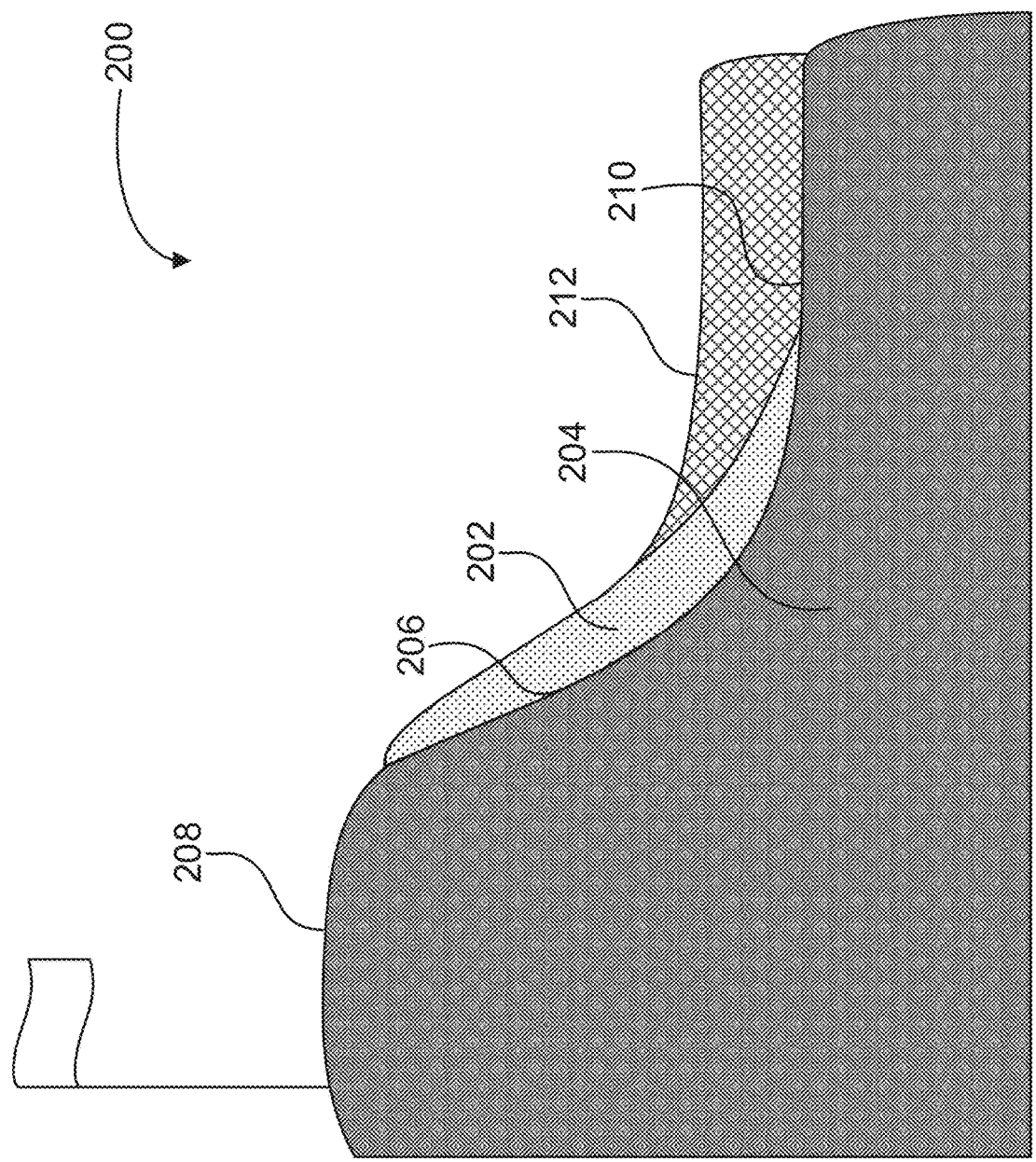
FIG. 3 illustrates a cross-sectional view of another exemplary golf course bunker according to one embodiment of the present disclosure.

In one non-limiting example application, an erosion resistant composition 202 can be used in a golf course bunker 200 as depicted in FIG. 3. The golf course bunker 200 includes an under layer 204 that is positioned below the erosion resistant composition 202 and a playable sand composition 212. In some embodiments, the under layer 204 includes an angularly-inclined wall 206 that slopes vertically downwards to connect an upper surface 208 to a lower surface 210. The golf course bunker 200 includes approximately 1 to 5 inches of the erosion resistant composition 202 positioned above the angularly-inclined wall 206. Although the majority of the erosion resistant composition 202 is positioned above the angularly-inclined wall 206, some of the erosion resistant composition 202 may extend into the lower surface 210. In other embodiments, the erosion resistant composition 202 covers between 60 to 100% of the angularly-inclined wall 206. In other aspects, the erosion resistant composition 202 covers at least 85% of the inclined wall 206. The golf course bunker 200 also includes approximately 2 to 12 inches of the playable sand 212 positioned above the lower surface 210. In some aspects, portions of the playable sand may also be positioned above the erosion resistant composition 202.

In some embodiments, a suitable under layer 204 can comprise any of the soils listed above. A suitable erosion resistant composition 202 can include any combination of the plurality of granular materials 114 and wax 116 listed above. A suitable playable sand 212 can include any of the granular materials 114 listed above.

Figure 4:
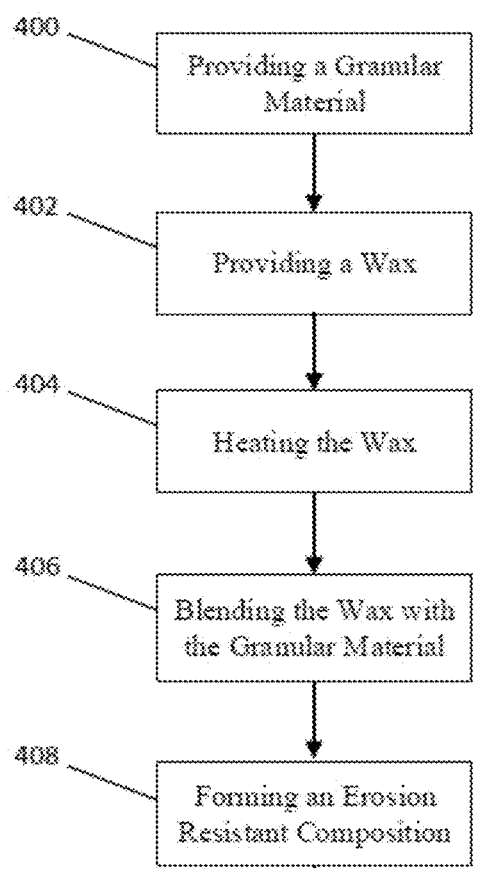
FIG. 4 is a flow diagram illustrating a method of forming an erosion resistant composition for a golf course bunker according to one embodiment of the present disclosure.

The present disclosure also relates to a method of manufacturing an erosion resistant composition 102, as depicted in FIG. 4. The method utilizes a plurality of granular materials 114 and a wax 116 which may be obtained at steps 400 and 402, respectively. The plurality of granular materials 114 are pre-dried until they are substantially free from liquid or moisture. The wax 116 is then heated to its melting point to form a melted wax at step 404. In some embodiments, the wax 116 is heated to a temperature between 180 to 400° F. The melted wax 116 and the plurality of granular materials 114 are then blended together to form the erosion resistant composition 102 at steps 406-408. In some embodiments, the blending occurs in a pug mill process unit or a rotary blender. However, any suitable blending process unit may be potentially used to perform step 406. In some aspects, the content of wax 116 in the erosion resistant composition 102 is between 2 to 8% by weight.

In some embodiments, providing a plurality of granular materials 114 at step 406 may include first crushing recycled plumbing fixtures to produce a sand or sand-like substance.

In some aspects, the recycled plumbing fixtures can include porcelain toilets, sinks, bathtubs, bathroom tiles, or anything of the like.

The method for manufacturing an erosion resistant composition 102 can occur in either a continuous or a batch process. In some embodiments, the erosion resistant composition is produced in a continuous process at a rate between 20 to 50 tons/hr.

It will be appreciated that while the erosion-resistant composition is described as being used in the construction of golf course bunkers, that the erosion resistant composition may be used more widely in landscaping and land forming applications. For example, the composition may be used for the purpose of constructing pathways, playing surfaces (e.g., for sports activities), or one of any various other ground cover applications for which a granular material might be employed.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for forming an erosion resistant composition, the method comprising:

drying a granular material until the granular material is free from liquid or moisture, the granular material comprising sand and having a first resistance to flow;

heating a wax above a melting point of the wax to form a melted wax, the wax comprising an oil content between 0.01-15% by weight; and blending the melted wax with the granular material to at least partially coat a portion of the granular material to form the erosion resistant composition, the erosion resistant composition having a second resistance to flow after coating that is greater than the first resistance to flow prior to coating.

2. The method of claim 1, wherein drying the granular material occurs in a rotary dryer.

3. The method of claim 1, wherein the step of heating the wax involves heating the wax to between 180 and 400° F.

4. The method of claim 1, wherein the step of blending occurs in a pug mill or rotary mixer.

5. The method of claim 1, wherein the step of blending involves adding melted wax to the granular material in an amount such that a weight percent of the wax in the erosion resistant material is 2% to 8%.

6. The method of claim 1, wherein the erosion resistant composition is produced in a continuous process at a rate between 20 to 50 ton/hr.

7. The method of claim 1, wherein the method is performed as a batch process.

* * * * *